Patented May 26, 1925.

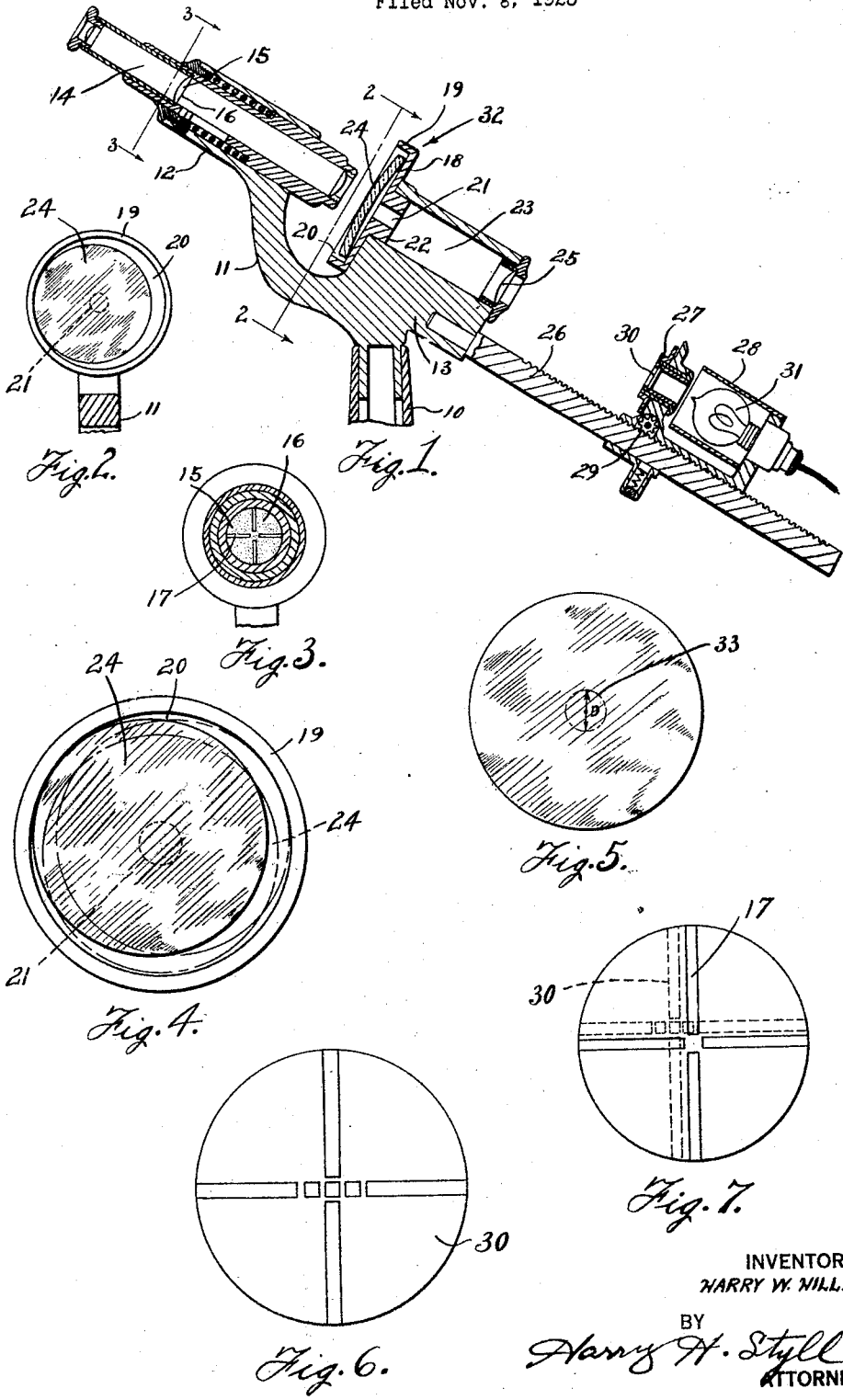

1,538,991

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

ATTACHMENT FOR LENS-EXAMINING INSTRUMENTS.

Application filed November 8, 1923. Serial No. 673,517.

*To all whom it may concern:*

Be it known that I, HARRY W. HILL, a citizen of the United States, residing at Southbridge, in the county of Worcester and State of Massachusetts, have invented certain new and useful Improvements in Attachments for Lens-Examining Instruments, of which the following is a specification.

The present invention relates to an improved attachment for use in connection with lens examining instruments, and has particular reference to an attachment adapted to facilitate the locating of the optical center of a lens.

Heretofore in finding the optical center of a lens the lens has been placed on a suitable lens seat and the center is marked by means of an inked point, or the like, after which the lens has been placed upon a chart to see whether or not a satisfactory finished lens can be obtained from the lens blank.

The present invention has, therefore, for one of its principal objects to provide an attachment of this nature that will obviate the necessity of marking the lens and placing the same upon a chart.

Another very important object of the invention is to provide an attachment of this nature that may be used in connection with a lens examining instrument to facilitate the ascertaining of the optical center of a lens and to determine at the same time whether or not the desired finished lens can be cut from the blank.

Another very important object of the invention is to provide a device of this nature that may be readily removed from the instrument with which it is used so that a plurality of various size attachments may be used in order to check up on various sized lens blanks.

Another object of the invention is to provide a device of this nature that will be very strong, durable, simple of construction and manufacture, and that will be particularly well adapted to the uses for which it is designed.

Other objects and advantages of the invention will become apparent during the course of the following description.

In the drawings, wherein like numerals are employed to designate like parts throughout the same;

Figure 1 is a vertical longitudinal section taken through one form of instrument with which my device may be used.

Figure 2 is a section taken on line 2—2 of Figure 1, showing my invention in elevation.

Figure 3 is a section taken on line 3—3 of Figure 1.

Figure 4 is a front elevation of my device illustrating the various positions assumed by a lens blank when in use.

Figure 5 is a top plan view of a lens showing diagrammatically the area in which the optical center may be decentered.

Figure 6 is a front elevation of one of the targets used in the instrument; and

Figure 7 is a diagrammatic view of the target images.

In the drawings, wherein for the purposes of illustration is shown the preferred embodiment of my invention, the numeral 10 designates a base of an instrument that may be used, and supports the head 11, which comprises a pair of arms or branch portions 12 and 13, respectively. A lens system designated in its entirety by the numeral 14, is disposed within the branch portion 12, and includes a lens 15 which has a ground surface 16 upon which a cross 17 is etched, cut or otherwise formed. The cross 17 is formed upon the flat face 16 of said lens.

My device, which may be formed from any suitable material, such as hardened rubber, fiber, bakelite, etc., comprises a flat body portion 18 having rising therefrom an annular flange 19 so as to form a recess 20. The body portion 18 has a centrally disposed aperture 21 around which and extending laterally from the body portion is arranged a sleeve portion 22. The sleeve portion 22 is adapted to be received within the bore 23 of the branch portion 13, as is clearly shown in Figure 1 of the drawings. The lens 24 to be tested is placed within the recess 20, as will be more fully described hereinafter. A suitable lens 25 is disposed at the rear of the bore 23.

Extending from the branch 13 is a rack bar 26, upon which is pivotally mounted a target cage 27, which is connected to the light compartment 28. The cage and compartment 27 and 28, respectively, are moved along the rack 28 by means of the pinion 29. A target similar to that shown in Figure 6, and designated by the numeral 30 is disposed in advance of the means of illumination 31.

In use my attachment, which is designated in its entirety by the numeral 32, is placed within the bore 23, as illustrated, and the lens 24 is placed within the recess 20 and moved around until the images become superimposed. In locating the optical center of a lens it is found that the optical center frequently does not coincide with the geometrical center so that it has become a practice to form a blank somewhat larger than that of the finished blank. In this connection in common practice the amount of decentration may be about three millimeters in any direction, thus falling in the area in Figure 5 enclosed by the dotted lines 33. It will thus be seen that the diameter D in this view will be approximately six millimeters. In other words, if the lens 24 is approximately circular and is disposed centrally within the recess 20 there will be about a three millimeter clearance between the flange 19 and the edge of the lens around its entire periphery.

When the optical center is placed in alignment with the bores in the arms, the images from the targets 15 and 30, respectively, will become superimposed, as is illustrated by full lines in Figure 7 of the drawings. If, however, the optical center is not in perfect alignment the images will not be superimposed and will assume an appearance similar to the one illustrated in Figure 7 by the full and dotted lines. It then becomes necessary to shift the lens before the bore 23 until the images become superimposed. A diagrammatic view of the manner in which the lens is moved about within the recess is shown in Figure 4, and it will be seen that if the images do at any time become superimposed while the lens 24 is within the recess 20 the desired lens may be cut from the blank and no further testing or marking is required. It will thus be seen that various sized members 32 may be had, depending upon the size of the blank tested and the size of the lens desired.

In use my invention will cut down to a considerable extent the time and labor that has ordinarily been required in locating the optical center and checking up and seeing whether or not a suitable lens can be cut from the blank. In the present invention one operation only is required, and no chances of mis-calculation can enter in due to incorrect marking or incorrect placement upon a chart, as has heretofore been done. Of course, various shaped attachments may be devised, and I do not wish to unnecessarily limit myself to the form as shown, and it is, therefore, to be understood that the form of my invention herewith shown and described is to be taken as the preferred embodiment of the same and that various changes in the size, shape and arrangements of parts may be resorted to without departing from the spirit of my invention or the scope of the sub-joined claims.

Having thus described my invention, I claim:

1. In an optical instrument of the character described, means for determining the optical center of a lens, and a lens carrier placed in the field of said means, comprising a holder for the lens allowing a determined amount of play between the holder and the edges of the lens, and an aperture in line with the optical center determining means.

2. In an optical instrument of the character described, means for determining the optical center of the lens, and a carrier for the lens, comprising an annular flanged lens holder allowing a determined amount of play between the edges of the lens and the flange of the holder, and an aperture through the holder in line with the optical center determining means.

HARRY W. HILL.